Sept. 11, 1956    A. BELLOMO    2,762,211
UNIVERSAL JOINT
Filed Sept. 28, 1954

INVENTOR
ANDREA BELLOMO
By Andrew E. Hary
ATTORNEY

United States Patent Office 2,762,211
Patented Sept. 11, 1956

2,762,211

UNIVERSAL JOINT

Andrea Bellomo, Rome, Italy

Application September 28, 1954, Serial No. 458,902

Claims priority, application Italy October 1, 1953

11 Claims. (Cl. 64—21)

The invention has for its object a homokinetic joint for the transmission of the torque from angled shafts, consisting of a plate enclosed by a fork, between which are inserted four balls each of which is guided in two grooves which intersect each other symmetrically in the plane containing the intersection of the axes of the shafts and dividing the angle between the said axes into two equal parts. The fork is generally traversed by a member provided with stops and holding means for adjusting and fixing during assembly, the opening of the fork in order to impart the correct coupling degree to the assembly and to position relatively to each other the arms of the fork which the torque tends to separate. The said traversing member is, moreover, generally used for carrying other functional elements or it is so designed as to complete the functional structure of the joint.

In the known joints based on the same principle, the grooves serving to guide the transmission balls are provided on the sides of arms integral with the respective shafts, but the said arms are completely sprung so that the maximum torque is limited by the flexing of the said arms and in addition machining within close limits is necessary to obtain the exact degree of coupling of the whole assembly, because it is not possible on assembly to modify the distance between the coupled grooves.

Another advantage of the present invention consists, for example, in the production of a joint having a fixed pivotal centre highly resistant to the loads which tend to separate or close the two parts of the joint even when running at high angular velocities, because a central spherical pivot mounted on the fork is retained centrally of the plate by means of a spherical seating, which can be adapted directly to withstand the said loads. Another advantage consists, for example, in the production of a sliding joint occupying a limited space and which can, moreover, be protected by a casing connected to the fork, because the relative sliding and angular motion of the plate is contained within the opening of the fork.

Figure 1:
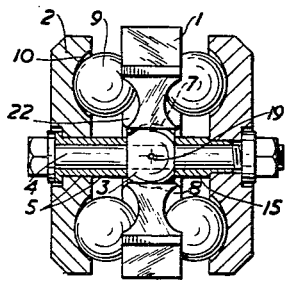
Figure 2:
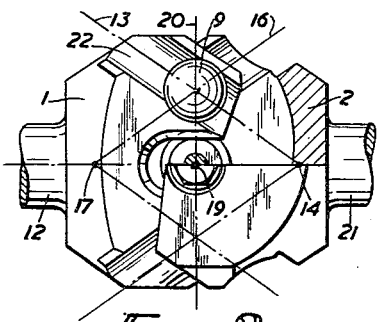
Figure 3:
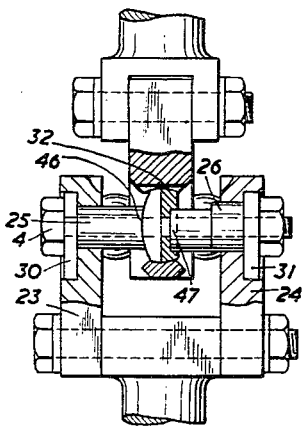
Figure 4:
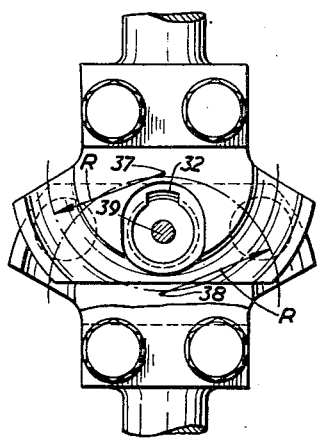
Figure 5:
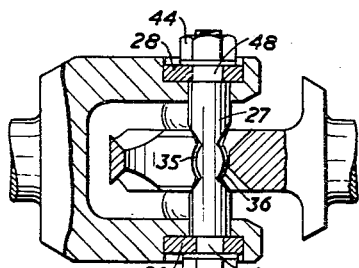
Figure 6:
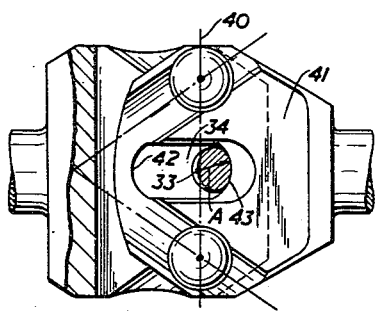

The accompanying drawings show, by way of example, a number of embodiments of a joint according to the present invention. Figures 1 and 2 show a fixed centrally pivotal joint partly in section axially of the aligned shafts and in side elevation respectively. Figures 3 and 4 show in plan side view and side elevation another fixed centrally pivotal joint, partly in section. Figures 5 and 6 show in plan view and side elevation a sliding joint, partly in section.

According to the present invention, the joint consists of two parts 1 and 2 either integral with or coupled to the respective shafts 12 and 21, the former having the shape of a plate enclosed by the second in the shape of a fork and between which the torque is transmitted by four balls, each of which is carried in two opposing grooves, like the ball 9 between the grooves 22 and 10, one of which is made on one side of the plate and the other on the inner side of the fork opposite thereto, so that the axis of each groove is generally contained in a plane parallel to the axis of the corresponding shaft. The axes of the grooves may be rectilinear as shown in Figures 2 and 6, or curvilinear and, for example, circular, as shown in Figure 4. It is well known that in order to obtain the homokinetic transmission the axes 13—14 and 16—17 of two grooves containing one and the same ball, must be symmetrical, that is to say mirror images of each other, relatively to the plane 20 orthogonal to the axis of the aligned shafts containing the pivotal centre 19 of the joint, in which plane the two grooves intersect each other at equal angles at 18 where they surround the centre of the ball. For the circular grooves as shown in Figure 4, these conditions are maintained if the axes of the grooves have the same radius R and the centres 37 and 38 are equidistant from the pivotal centre 39. The straight section of the grooves is generally circular having a radius equal to that of the balls and has an amplitude of about 120°.

As shown in Figures 3 and 4, the fork may consist of two plates 23 and 24 maintained apart by distance pieces and held by bolts or other means. A model joint according to Figures 3 and 4 can be improvised with a few bearing discs of normal thrust ball bearings.

According to the present invention, the fork is generally traversed by a member consisting for example of a bolt 4 having distance pieces such as 5 or 15 or 25 or 26, or by a pin 27 provided with rings such as 28 and 29, and the position of which is determined by steps or grooves, and with fixing nuts such as 44 and 45. Such a traversing member permits of adjusting and fixing the opening of the fork, when the joint is free from load, if necessary by bending the arms inwardly or outwardly in order to cancel out any play or to reduce any excess stresses due to inaccurate machining or deformation under the action of heat or even brought about intentionally during the making of the grooves.

A bolt 4 tightened on one or two distance pieces such as 5 or 25 or 26 having flanges or washers externally of the fork permits during the assembling of tightening the arms of the fork to the extent determined by the length of the said distance pieces. One or two distance pieces such as 15, secured by the bolt between the inner faces of the fork permit of closing or opening the arms. Similarly, a pin such as 27 permits of closing the arms of the fork by tightening with the nuts 44 and 45 the washers 28 and 29 against the respective steps in the pin, the final opening of the fork being determined by the distance between the said steps. One of the washers with its corresponding nut may be replaced by enlarging the head of the pin. If, on the contrary, it is necessary to expand the arms of the fork, the pin must be provided with steps or projections bearing against the inner faces of the fork arms. In any case, the same object can be achieved by means of elements screwed into the arms of the fork.

According to the present invention the transverse element of the fork generally carries other members or is itself designed to complete the functional structure of the joint. As shown for example by Figures 1, 2, 3 and 4, the bolt 4 passes through and between the distance pieces of a spherical pivot such as 3 housed and held in a spherical seating provided in the plate. This seating is open, that is to say is formed by two opposing spherical zones 7 and 8, as shown in Figures 1 and 2, or it is closed as shown in Figures 3 and 4, in which case it is provided with a recess such as 32 for the insertion of the ball pivot during assembly. This last mentioned embodiment is suitable for high loads tending to separate or close the two parts of the joint.

According to another embodiment shown in Figures 5 and 6, which refer to a sliding joint, the pin 27 limits the maximum opening and closing of the two parts, because its outward movement is restricted by the slot 34 provided in the plate 41. The central part of the pin is designed as two opposing spherical zones 35 and 36 and the ends 42 and 43 of the slot are formed with spherical or cylindrical surfaces having a radius A equal to that of the respective spherical zone of the pin. Moreover, the position of the pin on the fork and the position of the slot in the plate are so determined that when the joint is completely extended or completely closed, as shown in Figures 5 and 6, the common centre 33 of the zone, such as 36 of the pin in contact with the end such as 43 of the slot, is in the plane 40 containing the centres of the transmission balls, so that the point 33 coincides with the pivotal centre of the joint which is thus correctly articulated even in the positions of maximum and minimum extension.

The present invention likewise comprises means for preventing the transverse member rotating in the fork and the members, if any, carried by the transverse member rotating thereon. For example the distance pieces 25 and 26 shown in Figure 3 are provided with eccentric flanges 30 and 31 respectively, held in the arms of the fork in seatings eccentric relatively to the hole in the distance piece. The distance piece 25 in turn, prevents the spherical pivot from rotating on the bolt 4 by means of the curved contact and locking surface 46. The distance piece 26, on the contrary, achieves the same object, being held in the pivot in a seating 47 eccentric relatively to the axis of the bolt. According to another embodiment, in order to prevent a pin 27 rotating in the fork, it is provided with one or two square legs such as 48 and 49 fitting into the square holes of one or two washers such as 28 or 29 which are eccentric and held in the arms of the fork in seatings eccentric relatively to the axis of the pin, or the pin itself is provided with an enlarged eccentric head held in one arm of the fork.

I claim:

1. A homokinetic universal joint comprising two members, a pair of spaced plates extending from one member, a third plate extending from the other member and projecting between said spaced plates, runways in the opposed faces of said spaced plates and in the faces of said third plate, the axis of each runway in a face of one of the plates of said pair of plates intersecting the axis of a runway in the adjacent face of said third plate, the points of intersection lying symmetrically in the plane which bisects the angle between the axes of said members and which includes the point of intersection of said axes, balls located between each plate of said pair of plates and the adjacent face of said third plate, each said ball engaging in two runways at the point of intersection of the axes thereof, and a coupling member positively engaging each of said pair of plates and holding said pair of plates in fixed spaced relationship.

2. A homokinetic universal joint comprising two members, a pair of spaced plates extending from one member and a third plate extending from the other member and projecting between said pair of plates, two runways in each of the opposed faces of the pair of plates, and in each face of said third plate, the axis of each runway in each face intersecting the axis of a runway in the adjacent opposed face, the points of intersection lying symmetrically in the plane which bisects the angle between the axes of said members, a ball engaging each pair of runways whose axes intersect in said plane at such point of intersection and an element traversing the spaced pair of plates, said element comprising stops engaging the spaced plates and positively holding said plates in fixed spaced relationship.

3. A homokinetic universal joint comprising two members, a pair of spaced plates extending from one member and a third plate extending from the other member and projecting between said pair of plates, two runways in each of the opposed faces of the pair of plates, and in each face of said third plate, the axis of each runway in each face intersecting the axis of a runway in the adjacent opposed face, the points of intersection lying symmetrically in the plane which bisects the angle between the axes of said members, a ball engaging each pair of runways whose axes intersect in said plane at such point of intersection, an element extending through said plates, stop means on said element positively limiting the maximum spacing of said spaced plates, and a bearing member carried by said element, said bearing member engaging with said third plate.

4. A homokinetic universal joint according to claim 3 in which the third plate defines an open mouthed recess for reception of the bearing member.

5. A homokinetic universal joint according to claim 3 in which the third plate defines a recess for the bearing member and a passage for insertion of said bearing element from one side of the plate.

6. A homokinetic universal joint comprising two members, a pair of spaced plates extending from one member and a third plate extending from the other member and projecting between said pair of plates, two runways in each of the opposed faces of the pair of plates, and in each face of said third plate, the axis of each runway in each face intersecting the axis of a runway in the adjacent opposed face, the points of intersection lying symmetrically in the plane which bisects the angle between the axes of said members, a ball engaging each pair of runways whose axes intersect in said plane at such point of intersection, an element extending through said spaced plates, stop means on said element positively limiting the maximum spacing of said spaced plates, a bearing member carried by said element and engaging in said third plate, and locking pieces on said element engaging at least one of said spaced plates and locking said bearing member against rotation.

7. A homokinetic universal joint comprising two members, a pair of spaced plates extending from one member and a third plate extending from the other member and projecting between said pair of plates, two runways in each of the opposed faces of the pair of plates, and in each face of said third plate, the axis of each runway in each face intersecting the axis of a runway in the adjacent opposed face, the points of intersection lying symmetrically in the plane which bisects the angle between the axes of said members, a ball engaging each pair of runways whose axes intersect in said plane at such point of intersection, a bolt extending through said spaced plates, the engagement of said balls with each pair of runways limiting the inward displacement of said pair of plates and said bolt limiting the outward displacement of said pair of plates.

8. A homokinetic universal joint comprising two members, a pair of spaced plates extending from one member and a third plate extending from the other member and projecting between said pair of plates, two runways in each of the opposed faces of the pair of plates, and in each face of said third plate, the axis of each runway in each face intersecting the axis of a runway in the adjacent opposed face, the points of intersection lying symmetrically in the plane which bisects the angle between the axes of said members, a ball engaging each pair of runways whose axes intersect in said plane at such point of intersection, a bolt passing through said spaced plates, spacers carried by the bolt, a spherical member carried by the bolt and engaging a spherical seat in said third plate, at least one of said spacers engaging a plate and said spherical member eccentrically of the bolt and holding said spherical member against rotation.

9. A homokinetic universal joint comprising two members, a pair of spaced plates extending from one member and a third plate extending from the other member and projecting between said pair of plates, two runways in each of the opposed faces of the pair of plates, and in each face of said third plate, the axis of each runway in each face intersecting the axis of a runway in the adjacent opposed face, the points of intersection lying symmetrically in the plane which bisects the angle between the axes of said members, a ball engaging each pair of runways whose axes intersect in said plane at such point of intersection, a bolt extending through said spaced plates and through a slot in said third plate, the ends of the slot defining the limits of relative longitudinal motion of said two members.

10. A homokinetic universal joint comprising two members, a pair of spaced plates extending from one member and a third plate extending from the other member and projecting between said pair of plates, two runways in each of the opposed faces of the pair of plates, and in each face of said third plate, the axis of each runway in each face intersecting the axis of a runway in the adjacent opposed face, the points of intersection lying symmetrically in the plane which bisects the angle between the axes of said members, a ball engaging each pair of runways whose axes intersect in said plane at such point of intersection, a bolt extending through said spaced plates comprising a bearing member having two opposing spherical zones and lying in a slot in said third plate, the ends of which slot are spherically shaped to a radius corresponding to the radius of said spherical zones, the common centre of said bearing member and one of said slot ends lying in the plane including the centres of the balls when the bearing member is at one of the ends of the slot which ends define the limits of opening and of closing of the joint.

11. A homokinetic universal joint according to claim 10 in which the bearing member carries at least one eccentric which engages one of said spaced plates to lock the bearing member against rotation.

References Cited in the file of this patent
UNITED STATES PATENTS

| | | |
|---|---|---|
| 1,774,578 | Weiss | Sept. 2, 1930 |
| 2,156,106 | Bill | Apr. 25, 1939 |